United States Patent [19]
TenEyck et al.

[11] Patent Number: 5,585,312
[45] Date of Patent: Dec. 17, 1996

[54] HIGH TEMPERATURE STABLE CONTINUOUS FILAMENT GLASS CERAMIC FIBER

[75] Inventors: John D. TenEyck, Lewiston; Thomas M. Clere, Williamsville; James Olson, Youngstown, all of N.Y.; Steven Waisala, Aurora, Ohio

[73] Assignee: Unifrax Corporation, Niagara Falls, N.Y.

[21] Appl. No.: 575,060

[22] Filed: Dec. 21, 1995

Related U.S. Application Data

[63] Continuation of Ser. No. 294,258, Aug. 23, 1994, abandoned.

[51] Int. Cl.$^6$ ................................................ C03C 13/02
[52] U.S. Cl. ................................ 501/35; 501/38; 501/69; 188/251 A
[58] Field of Search ................................ 501/38, 35, 69; 188/251 A

[56] References Cited

U.S. PATENT DOCUMENTS

| | | | |
|---|---|---|---|
| 3,380,818 | 4/1968 | Smith | 65/33 |
| 3,402,055 | 9/1968 | Harris et al. | 106/50 |
| 3,459,568 | 8/1969 | Rinehart | 106/52 |
| 3,597,179 | 8/1971 | Simmons | 65/30 |
| 3,759,353 | 9/1973 | Marin | 188/71.5 |
| 3,804,608 | 4/1974 | Gaskell et al. | 65/33 |
| 3,871,934 | 3/1975 | Marin | 156/94 |
| 4,036,654 | 7/1977 | Yale et al. | 106/52 |
| 4,078,939 | 3/1978 | Schwochow et al. | 106/50 |
| 4,102,692 | 7/1978 | Schartau et al. | 106/50 |
| 4,140,506 | 2/1979 | Machlan | 65/2 |
| 4,159,205 | 6/1979 | Miyahara et al. | 106/73.4 |
| 4,277,269 | 7/1981 | Sweeting | 65/2 |
| 4,379,111 | 4/1983 | Smith et al. | 264/137 |
| 4,492,722 | 1/1985 | Ritter, II et al. | 427/226 |
| 4,558,015 | 12/1985 | Ekdahl et al. | 501/38 |
| 4,582,748 | 4/1986 | Eastes et al. | 501/38 X |
| 4,868,142 | 9/1989 | Waisala et al. | 501/85 |
| 5,064,785 | 11/1991 | Kawamoto et al. | 501/72 |

OTHER PUBLICATIONS

Sue, Y, et al, Surface nucleation and cellular growth kinetics of cordierite glass ceramics containing 3 mol % $Y_2O_3$—$ZrO_2$, Journal of Materials Science 26 (1991) 1699–1704.

Sue, Y. et al, Spherulitic growth from a phase–separated Vitreous Matrix in a Cordierite–Y–Stabilized Zirconia glass–Ceramic, J. Am. Ceram. Soc., 74[1] 85–91 (1991).

Murakami, Y., et al, Phase Equillibria in the $Al_2O_3$—$Y_2O_3$—$SiO_2$ System, and Phase Separation and Crystallization Behavior of Glasses, Journal of the Ceramic Society of Japan. Int Edition, vol. 99—210–216, (1990).

Wallenberger, F. et al, Inviscid Melt Spinning of Alumina Fibers—Chemical Jet Stabilization, J. Am. Ceram. Soc., 75 [3] 629–636 (1992).

Vogel, W., et al, Nucleation and crystallization kinetics of an MgO—$Al_2O_3$—$SiO_2$ base glass with various dopants. pp. 125–145.

Robinson, J. W., et al., Ceramic Fibers for friction applications, Automotive Engineering, vol. 98, No. 12, (1990) 47–52.

Lowenstein, K. L., The Manufacturing Technology of Continuous Glass Fibres, 2nd Ed. (Elsevier, 1983) 32–55.

Cheng, Y. et al The Behavior of $ZrO_2$ in $Y_2O_3$—$SiO_2$ Glasses, Br. Ceram, Trans. J., 87, 107–110, (1988).

(List continued on next page.)

Primary Examiner—Karl Group
Attorney, Agent, or Firm—Renner, Kenner, Greive, Bobak, Taylor & Weber

[57] ABSTRACT

Composition and process for the preparation of high temperature stable continuous glass ceramic fibers with an upper temperature use limit of 2300° F. are provided. The compositional formulation, in mole percent, is 62-85% $SiO_2$, 9.5-20% $Al_2O_3$, 5-15.5% MgO, 0.5-5% $TiO_x$, and 0-5% $ZrO_2$. The continuous fibers are prepared by an economical direct melt method, and demonstrate high tensile strength, high Young's modulus, and low linear thermal shrinkage characteristics.

23 Claims, 4 Drawing Sheets

OTHER PUBLICATIONS

Kajiwara, M., Formation and Crystallisation of $Al_2O_3$—$TiO_2$—$SiO_2$ glasses, Glass Technology vol. 29 No. 5, Oct. 1988, 188–192.

Hayashi, K. et al, Densification of Compacted Magnesium Alumino—Silicate Glass Powders, Journal of the Ceramic Society of Japan, Int. Edition, vol. 98–1077, 11–16, (1990).

Shyu, J. et al, Effect of $TiO_2$ addition on the nucleation of apatite in an $MgO$–$CaO$–$SiO_2$–$P_2O_5$ glass, Journal of Materials Science Letters, 10 (1991), 1056–1058.

Lambertson, W. A., et al, Continuous Filament Ceramic Fibers, WADD Technical Report 60–244, (1960) 19–51, 57–59.

Maier, V. et al, Nucleation and crystallization in Mg–Al-silicate–glass–ceramics, Cfi/Ber.DKG 6/7, (1988), 208–212.

HIGH TEMPERATURE STABLE CONTINUOUS FILAMENT GLASS CERAMIC FIBER

This application is a continuation of application Ser. No. 08/294,258 filed Aug. 23, 1994, now abandoned.

FIELD OF THE INVENTION

The present invention relates to a method of producing continuous filament glass ceramic fibers. More particularly, it relates to a relatively low cost method of producing continuous filament glass ceramic fibers with an upper temperature use limit equivalent to refractory ceramic fiber of 2300° F.

BACKGROUND OF THE INVENTION

Glass fibers are the oldest type of strong fibers used in applications such as composite structural materials. Although the possibility of forming fibers from heat-softened glass was known thousands of years ago, these fibers were discontinuous, and it was not until the 1930's that the production of continuous glass fiber became commercially viable. The first use for substantial quantities of continuous glass fiber was for electrical insulation of fine wires used at elevated temperatures. The continuous glass fibers for this application became known as "E" glass because of their electrical properties. "E" glass does not have a specifically defined composition, but is a type of glass of defined electrical properties, and is generally a low alkali, calcium aluminum borosilicate. "E" glass has an upper temperature use limit of about 1100° F.

Improvements over the properties of "E" glass have been made through elimination of the alkali and other low melting components. This resulted in the development of "S" glass, known for its strength properties. "S" glass is a magnesium-aluminosilicate composition with considerably higher strength and modulus, and an upper temperature use limit of about 1500° F.

The preparation of glass fiber with higher temperature use limits is desirable, and has been pursued through post treatment of "S" glass. U.S. Pat. No. 3,402,055 describes the application of a variety of substances through aqueous or organic solvent base treatments of magnesium-aluminosilicate fibers to enhance temperature resistance of the fibers. U.S. Pat. No. 4,379,111 describes uniformly coating fibers with chromium oxide to enhance heat resistance over uncoated fibers or non-uniformly coated fibers of the same composition. U.S. Pat. No. 4,492,722 describes the deposition of a surface coating consisting essentially of $TiO_2$ from an organic solution to extend the upper use temperature limit to approximately 2000° F. These post treatments, however, are expensive processes.

Traditional refractory ceramic fiber (RCF) has an upper temperature use limit of 2300° F. and is inexpensively produced in several forms, but all of these forms are discontinuous. Continuous filament ceramic fibers are known, but they must be produced through expensive sol-gel routes.

There are many advantages of fiber in continuous form over traditional discontinuous refractory ceramic fiber, including the elimination of shot, the ability to chop filaments to any desired length, the ability to utilize the filaments directly for the manufacture of textile products, product performance characteristics, and the ability to custom manufacture fibers of known diameter.

Shot refers to high density, unfiberized particles which are detrimental to thermal efficiency, act as stress risers in reinforcing applications, and cause excessive wear in friction applications.

The ability to chop continuous filaments to any desired length is particularly advantageous in papermaking and in reinforcing applications.

The ability to utilize continuous filaments directly for spinning and weaving for the manufacture of textile products eliminates the cost associated with the organic carriers required with traditional refractory ceramic fibers. Textile products produced with traditional discontinuous refractory ceramic fibers typically have lower tensile strength when compared to products produced with continuous fibers. The continuous filaments can be woven into cloth for fire protection or other high temperature applications.

Since continuous fiber can be manufactured more reproducibly than discontinuous fiber, the custom manufacture of fibers of known diameter, within narrow tolerances, is more facile using fibers in continuous form. In addition, the ability to control fiber diameter, especially the control of fiber diameters to values greater than those considered respirable, is beneficial from the aspect of physiological considerations as well as for thermal and reinforcement performance.

SUMMARY OF THE INVENTION

An object of the present invention is to prepare continuous filament glass ceramic fibers which have an upper temperature use limit higher than that of "S" glass.

Another object of the present invention is to prepare high temperature stable continuous filament glass ceramic fibers by a direct melt method which is more economical than sol-gel methods or post treatment processes.

A further object of the present invention is to prepare continuous filament glass ceramic fibers with an upper temperature use limit equivalent to refractory ceramic fiber.

These and other objects and advantages of the invention set forth herein are accomplished by the present invention as hereinafter described and claimed.

We have found that continuous filament glass ceramic fibers with strength and thermal stability equivalent to traditional refractory ceramic fibers can be produced by conventional melt drawing techniques in the following compositional ranges expressed in mole percent:

| | |
|---|---|
| $SiO_2$ | 62–85, |
| $Al_2O_3$ | 9.5–20, |
| MgO | 5–15.5, |
| $TiO_x$ | 0.5–5, (wherein $0 \leq x \leq 2$), |
| $ZrO_2$ | 0–5. |

The present invention therefore provides high temperature stable glass ceramic fibers consisting essentially of about 62 to about 85 mole percent $SiO_2$, about 9.5 to about 20 mole percent $Al_2O_3$, about 5 to about 15.5 mole percent MgO, about 0.5 to about 5 mole percent $TiO_x$, wherein $0<x<2$, and 0 to about 5 mole percent $ZrO_2$.

The present invention further provides high temperature stable continuous filament glass ceramic fibers comprising about 62 to about 85 mole percent $SiO_2$, about 9.5 to about 20 mole percent $Al_2O_3$, about 5 to about 15.5 mole percent MgO, about 0.5 to about 5 mole percent $TiO_x$, wherein $0<x<2$, and 0 to about 5 mole percent $ZrO_2$.

We have also found that continuous filament fibers with preferred compositions within the above range have physical properties and thermal performance better than traditional refractory ceramic fibers. In particular embodiments of the invention, we have observed that the use of $TiO_2$ at low percentages in a preferred range of about 1 mole % to about 2 mole % results particularly in an increase in the upper use temperature limit of produced fibers, namely in beneficial low shrinkage characteristics for the produced fibers.

The present invention provides a process for the production of high temperature stable glass ceramic fibers, comprising melting a ceramic powder feed to form a melt, and forming said melt into filaments, wherein said ceramic powder feed consists essentially of about 62 to about 85 mole percent $SiO_2$, about 10 to about 20 mole percent $Al_2O_3$, about 5 to about 15 mole percent MgO, about 0.5 to about 5 mole percent $TiO_x$, wherein $0<x<2$, and 0 to about 5 mole percent $ZrO_2$.

The present invention also provides, by virtue of the low shrinkage characteristics and increased fiber diameters of produced filaments having compositions in the range specified above, useful compositions for the manufacture of refractory ceramic fibers by traditional blowing or spinning methods.

The present invention provides a process for producing continuous filament glass ceramic fibers, with an upper use temperature limit equivalent to refractory ceramic fiber of 2300° F., by an economical direct melt method.

The present invention therefore provides a process for the production of high temperature stable continuous filament glass ceramic fibers, comprising melting a ceramic powder feed to form a melt, and drawing said melt into continuous filaments, wherein said ceramic powder feed comprises about 62 to about 85 mole percent $SiO_2$, about 10 to about 20 mole percent $Al_2O_3$, about 5 to about 15 mole percent MgO, about 0.5 to about 5 mole percent $TiO_x$, wherein $0<x<2$, and 0 to about 5 mole percent $ZrO_2$.

The present invention further provides continuous filament glass ceramic fibers with increased upper use temperature limits, for use as insulation materials in a variety of forms, including woven textile products, ropes, braids, boards, papers, blankets, and mats.

The present invention also provides continuous filament glass ceramic fibers with increased upper use temperature limits and improved physical properties, for reinforcement of organic matrix materials, to provide increased tensile strength and modulus, increased flexural strength and modulus, and increased deflection temperature under load.

The present invention further provides continuous filament glass ceramic fibers with increased upper use temperature limits for use in friction materials; such as phenolics or for reinforcement of matrices of carbonized carbonaceous binders, otherwise known as carbon bodies, for such applications as friction discs for use in disc brakes, ranging from automotive to severe duty.

DETAILED DESCRIPTION OF THE INVENTION

The present invention is directed to the preparation of improved glass ceramic fibers for applications which include insulation and reinforcement of various matrices, the improvement comprising increased strength properties, improved shrinkage characteristics, and the preparation of these glass ceramic fibers with an upper use temperature limit equivalent to refractory ceramic fiber of 2300° F., but in a continuous form, through an economical direct melt method.

The objects of the invention are accomplished through the use of specific ranges of inorganic components in the preparation of glass ceramic fiber compositions. In particular, we have found that continuous filament glass ceramic fibers with strength and thermal stability equal to traditional refractory ceramic fibers can be produced from the following inorganic compounds in the composition ranges expressed in mole percent:

$SiO_2$ about 62–85, $Al_2O_3$ about 10–20,

MgO about 5–15, $TiO_x$ about 0.5–5 (wherein $0<x<2$), $ZrO_2$ about 0–5.

The inorganic feed compounds are commercially available in reagent and technical grade, for example silica, high quality calcined alumina, magnesia and rutile titania, from a number of domestic supplies.

The continuous filament glass ceramic fibers prepared using inorganic compounds in the above composition ranges can be produced by conventional melt drawing techniques.

We have also found that continuous filament fibers with preferred compositions within the above range have physical properties such as tensile strength, Young's modulus, and thermal shrinkage performance, such as exhibited in testing at 2300° C. for 24 hours, which are improved over traditional refractory ceramic fibers. In particular, we have found that the incorporation into the fiber of $TiO_x$, such as $TiO_2$, at preferred low percentages of about 1 mole % to about 2 mole %, and most preferably 1.25 mole % to about 1.5 mole %, provides an increase in the upper use temperature limit of produced fibers, namely in beneficial low shrinkage characteristics for the produced fibers.

Figure 1:
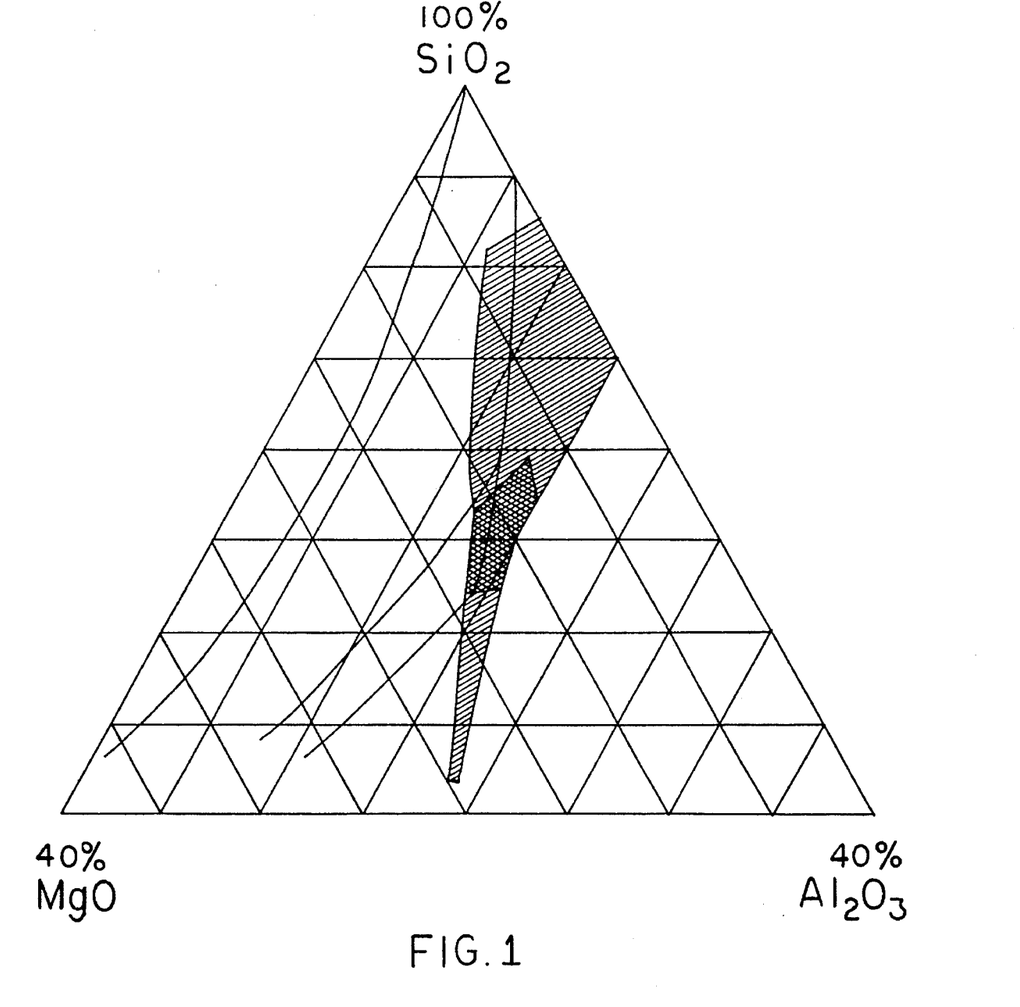
FIG. 1 is a molar composition diagram of glass components.

FIG. 1 is a molar composition diagram of glass components $SiO_2$, $Al_2O_3$ and MgO projected on a 0% titania plane. FIG. 1 details drawable glass fiber compositions in the lightly shaded area, and preferred drawable compositions containing 1.5% titania which particularly yield target properties in terms of improved strength and improved shrinkage characteristics in the dark shaded area. For the continuous filament glass ceramic fibers of the present invention, target properties with regard to improved strength are generally defined as tensile strength greater than about 250 Ksi and Young's modulus greater than about 12 Msi. The target property with regard to improved shrinkage characteristics is generally defined as less than about 3% shrinkage at 2300° F. for 24 hours. The lightly shaded area of FIG. 1 which lies within the compositional ranges of the glass ceramic components detailed above generally corresponds to the preferred ranges of those components, and the dark shaded area of FIG. 1 generally corresponds to the most preferred ranges of those components.

Compositions of high temperature stable continuous filament glass ceramic fibers of the present invention comprise i) about 62 to 85 mole % $SiO_2$, preferably 67.5 to 85%, more preferably, about 68 to 82% $SiO_2$, most preferably about 72 to 80% $SiO_2$;

ii) about 9.5 to 20 mole % $Al_2O_3$, preferably about 10 to 18% $Al_2O_3$, most preferably about 10 to 16% $Al_2O_3$;

iii) about 5 to 15.5 mole % MgO, preferably about 6 to 14% MgO, most preferably about 7 to 14% MgO;

iv) about 0.5 to 5 mole % $TiO_x$, preferably about 1 to 2% $TiO_x$, most preferably about 1.25 to 1.5% $TiO_x$; and v) 0 to about 5 mole % $ZrO_2$, preferably 0 to about 3% $ZrO_2$, most preferably about 0 to 2% $ZrO_2$. In some embodiments, $ZrO_2$ has been found useful in obtaining high tensile strength.

While the above compositions are preferred for continuous filament glass ceramic fibers, such compositions display improved properties when utilized in discontinuous high temperature stable glass ceramic fibers, also.

Figure 2:
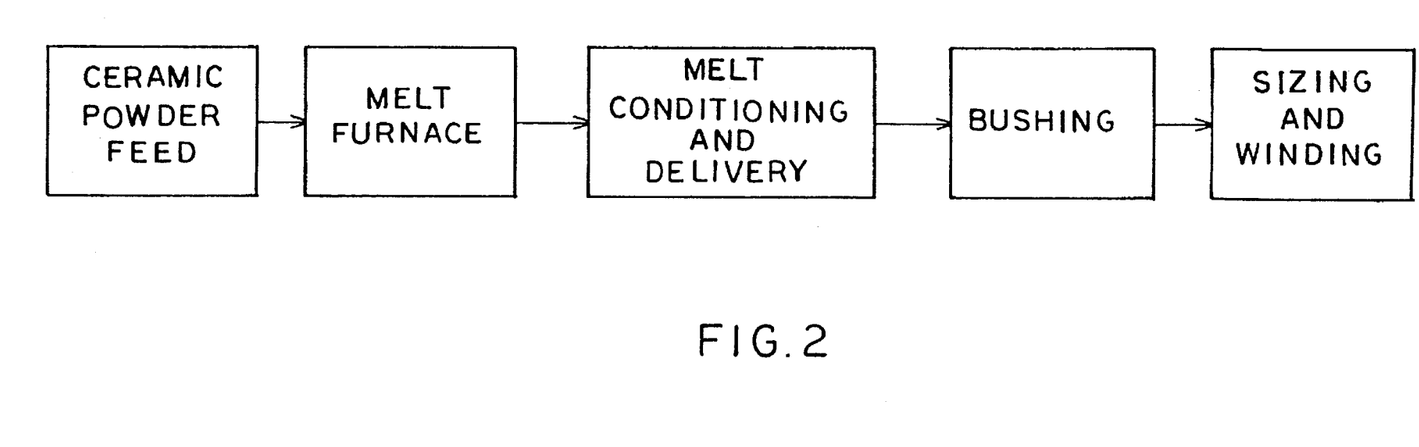
FIG. 2 is a block flow diagram of continuous filament production.

The present invention provides a method of producing continuous filament glass ceramic fibers, with an upper use temperature limit equivalent to refractory ceramic fiber of 2300° F., by an economical direct melt method. FIG. 2 is a block flow diagram of continuous filament production. The major steps in continuous filament production include preparation of a ceramic powder feed, introduction of the powder feed into a melt furnace, melt conditioning (such as fining) and delivery to the fiber-drawing furnaces, called bushings, from which the filaments are drawn, followed by sizing and winding of the fibers.

The manufacture of glass fiber products is generally considered to comprise three stages. The major steps illustrated in FIG. 2 describe Stages 1 and 2. Stage 1 consists of the actual glass manufacture, the fusion of selected raw materials in a melt furnace and delivery to the fiber-drawing furnaces. Stage 2 consists of the conversion of the glass into fibers in the fiber-drawing furnace, called the bushing. Continuous glass fibers are prepared through the rapid mechanical attenuation of molten drops of glass exuding from a large number of nozzles, usually about 200, located on the underside of the bushing which is usually electrically heated. Molten glass exudes from each nozzle where the glass forms a meniscus during fiber-drawing as a result of the mechanical attenuation. The individual fibers, known as filaments, pass over an applicator which deposits a protecting and lubricating size onto the filaments before they are gathered into bundles of filaments called strands. The strands then pass through a light water spray on their way to the winder, which consists of a slightly expandable rotating cylinder, called a collet, covered during the winding process by a removable plastic or paper tube onto which the strand is wound, and a device which lays successive lengths of strands onto the tube at small angles to one another to facilitate subsequent unwinding. Stage 3 consists of the conversion of the glass fibers into products.

Compositions of the present invention have melting points and drawing temperatures between about 1500° C. and about 2000° C. depending upon the specific component ranges utilized. Since the melting points and drawing temperatures are in excess of 1500° C., high temperature melting and drawing equipment are utilized in the manufacture of filaments according to the present invention. Other than the use of high temperature materials of construction, the actual melting and drawing of the filaments by the method of the present invention is accomplished following techniques known to those skilled in the art for melting and drawing of conventional fiberglass.

Although conventional direct melt methods are preferred due to economy of production, compositions of the present invention demonstrate improved properties over traditional refractory ceramic fibers, when manufactured as continuous refractory ceramic fibers by sol-gel methods, as well as refractory ceramic fibers manufactured by traditional blowing or spinning methods, or any other method known to those skilled in the art. Manufacture of high temperature stable continuous ceramic glass filaments according to the present invention results in increased fiber diameter, relative to standard aluminosilicate materials, when produced using a blowing fiberization technique. The ability to control fiber diameter, especially the ability to control fiber diameters to larger values, is beneficial from the aspect of physiological concerns as well as for certain thermal and reinforcement performance.

Compositions of the present invention demonstrate, within a preferred range of about 1 mole % to about 2 mole % $TiO_2$ in the overall composition and a most preferred range of about 1.25 to about 1.5 mole % $TiO_2$, a beneficial effect of low shrinkage characteristics for produced filaments. The reason for the improvement in shrinkage characteristics is not completely understood. While not being bound by theory, it is believed that the decreased shrinkage is due to a change in micro-structure within the fiber, from an essentially amorphous structure to a nucleated structure which readily crystallizes when reheated. This theory, however, has not been confirmed by detailed analysis.

We have found that the desired properties of the continuous filament glass ceramic fibers of the present invention can be enhanced when at least a portion of the titanium utilized in the melt is in a reduced form as compared to $TiO_2$. This can be accomplished by a variety of methods. One method is to utilize a form of titanium oxide other than, or in addition to, an appropriate portion of titanium dioxide (+4 oxidation state) in the melt. Such other forms include TiO (+2 oxidation state) and $Ti_2O_3$ (+3 oxidation state). Another method is to introduce at least a portion of the titanium component into the melt in the form of metallic titanium. A further method is to add other reducing agents into the melt (or furnace), such as carbon or carbon monoxide, or to use a furnace with a reducing environment, such as a graphite furnace.

The high temperature stable continuous filament glass ceramic fibers of the present invention demonstrate many advantages over traditional refractory ceramic fiber in discontinuous form. These advantages include, but are not limited to, the elimination of shot, the ability to chop filaments to any desired length(s), the ability to utilize the filaments directly for the manufacture of textile products, and the ability to custom manufacture fibers of known diameter.

Shot refers to high density, unfiberized particles which are detrimental to thermal efficiency, act as stress risers in reinforcing applications, and cause excessive wear in friction applications. The elimination of shot in the production of the continuous filament glass ceramic fibers of the present invention eliminates the necessity of an additional beneficiation step which is often employed in the production of other types of glass fibers in order to remove the deleterious shot from the fibers.

The ability to chop continuous filaments to any desired length is particularly advantageous in papermaking and in reinforcing applications where the performance of the end product is dependent upon the length of the fibers employed in the application as well as on the distribution of the lengths of those fibers. By chopping continuous fibers to preselected length(s), a narrower distribution of fiber lengths is obtained than is otherwise possible using discontinuous fibers.

Since continuous fiber can be manufactured more reproducibly than discontinuous fiber, the custom manufacture of fibers of known diameter, within narrow tolerances, is more facile when producing fibers in continuous form. By controlling fiber diameter, especially the control of fiber diameters to achieve larger values, fibers may be easily produced to match specifications of end-use applications in order to maximize beneficial thermal and reinforcement performance. Higher reproducibility for the production of fibers of this invention will result in a narrower distribution of diameters for produced fibers with concomitant improved performance in targeted applications. The average diameter of fibers produced according to the present invention are controllable within a range of about 5 to about 50 microns, and are preferably used in the range of about 5 to about 15 microns.

The continuous filament glass ceramic fibers of the present invention demonstrate an upper temperature use limit significantly higher than that of "E" glass or "S" glass. The continuous fibers of the present invention, therefore, are suitable for applications which currently use "E" glass or "S" glass while offering greatly improved high temperature stability in those applications.

The present invention demonstrates the preparation of continuous filament glass ceramic fibers with an upper temperature use limit equivalent to refractory ceramic fiber of 2300° F., while utilizing a direct melt method which is more economical than sol-gel methods or post treatment processes. The continuous fibers of the present invention, therefore, are suitable for applications which currently use traditional refractory ceramic fibers, while offering the improvements attributable to the continuous nature of the fiber and improved economy in those applications, as well as improved physical properties described above.

The continuous filament glass ceramic fibers of the present invention demonstrate high upper use temperature limits and are suitable for use by methods known in the art as insulation materials in a variety of forms, including woven textile products, ropes, braids, boards, papers, blankets, and mats. The ability to utilize the continuous filaments of the present invention directly for such processes as weaving and spinning for the manufacture of textile products provides a distinct advantage over the prior art, by eliminating the organic carriers required with traditional refractory ceramic fiber.

The high temperature stable continuous filament glass ceramic fibers of the present invention are suitable for use in the reinforcement of organic matrix materials. Reinforcement of organic matrices by the fibers of the present invention provide improved properties, including increased tensile strength and modulus, increased flexural strength and modulus, and increased deflection temperature under load. Organic matrices containing continuous fiber reinforcement display exceptional mechanical properties and are generally termed advanced composites to distinguish them from chopped-fiber reinforced materials.

Suitable organic materials for use as matrices in composites reinforced by the fibers of the present invention are generally polymeric materials of two broad classifications, thermoplastics and thermosets. Thermoplastics are polymeric materials which reversibly pass into a plastic state when heated and into a hardened state when cooled. Thermosets are polymeric materials which pass once through a plastic state and then harden irreversibly due to the formation of crosslinks.

Examples of thermoplastic polymers suitable for use in fiber-reinforced composite materials include, but are not limited to, polyamides such as nylon-6,6 and nylon-6, polyolefins such as polyethylene and polypropylene, polycarbonates, polyacetals, polystyrene, polysulfones, polyphenylene sulfide, and essentially linear polyesters and polyurethanes.

Examples of thermoset polymers suitable for use in fiber-reinforced composite materials include, but are not limited to, alkyd resins, diallyl orthophthalate resins, epoxy resins, phenolic resins, melamine resins, urea resins, silicone resins, polyester resins, and urethane resins.

The high temperature stable continuous filament glass ceramic fibers of the present invention are suitable for use in the reinforcement of matrices of carbonized carbonaceous binders, otherwise known as carbon bodies, produced conventionally. These carbon bodies are useful for a wide variety of applications, wherever strong lightweight bodies are needed, and are especially useful in friction applications. One such application is as friction discs for use in disc brakes, by virtue of the high heat capacity, high strength, high temperature stability, and high coefficient of friction of the glass ceramic fiber-reinforced carbon bodies. The continuous nature of the high temperature glass ceramic fibers of the present invention allows them to be successively circumferentially wound, axially compressed, and radially overlapped in order to prevent failure mechanisms due to improper orientation of the reinforcing fibers.

The continuous filament glass ceramic fibers of the present invention are useful for other friction applications, ranging from automotive to severe duty, when used with conventional binders such as phenolics, fillers, and friction modifiers, if any.

The specific embodiments described below are intended to illustrate, but not to limit, the present invention.

SPECIFIC EMBODIMENTS OF THE INVENTION

Continuous filament glass ceramic fibers were prepared according to the general procedure detailed in FIG. 2, a block flow diagram which outlines the major steps in continuous filament production. Ceramic powder feeds containing the various amounts of inorganic components detailed in the following numbered examples were prepared and introduced into a melt furnace, followed by melt conditioning and delivery to the bushing, followed by sizing and winding of the filaments. Diameters of samples were measured, and the filaments were tested for physical properties. Shrinkage characteristics for some samples were determined at 1800° F., 2100° F., and 2300° F.

Shrinkage Test

Shrinkage testing included the analysis of one gram of the tested fiber, ground and pressed into a bar. The linear shrinkage of the bars was measured with vernier calipers cold and then after heating at temperature. This method was confirmed by conducting the test on control K spun fibers and comparing the shrinkage of the K spun bar to the shrinkage of a blanket consisting of K spun fibers.

Tensile strength was tested at room temperature by a single filament measurement of a one inch gauge length section under strain. Young's modulus was determined from the tensile test data according to the equation $$\text{Modulus} = \frac{\text{Tensile stress}}{\text{Elongation}}$$

in a linear portion of the graph.

EXAMPLES

As set forth in Table I, examples 1–30 represent samples wherein the concentration of one or more components falls outside the range of compositions defined by the present invention. In the "Composition" column of the Tables, the designation "RO" stands for metal oxides other than silica and alumina, and this column may alternatively contain designations of the derivation of the particular comparative fibers exemplified.

Examples 1–3 represent "S" glass and "E" glass compositions. The upper use temperature limits for these samples are much lower than those of the glass ceramic fibers of the present invention. Examples 4–5 (K Spun) represent conventional refractory ceramic fibers derived from kaolin which contain higher $Al_2O_3$ percentages and lower MgO percentages than the fibers of the present invention. Examples 6–13 each contain MgO percentages lower than the fibers of the present invention. Examples 14–20 contain higher percentages of $SiO_2$, and lower percentages of $Al_2O_3$ and MgO than the fibers of the present invention. Examples 21–22 contain lower $Al_2O_3$ percentages than the fibers of the present invention. Examples 23–30 contain $SiO_2$, $Al_2O_3$, and MgO within the ranges of the fibers of the present invention, but no $TiO_2$ is contained in any of examples 1–30. Examples 1–30 are comparative examples which demonstrate physical properties which are generally poorer than those of the fibers of the present invention. For example, the fibers described in examples 1–30 demonstrate much larger shrinkage percentages than the fibers of the present invention, except for examples 4 and 5 which are more comparable (although these fibers are discontinuous).

Examples 31–86 of Table I generally comprise all inventive components within the composition ranges defined by the present invention, except for those examples described as K Spun which are derived from kaolin and which were measured as control samples to monitor test accuracy for standard shrinkage properties, and examples 42, 54, and 55 which contain no $TiO_2$ but are included as additional comparative examples to illustrate the beneficial effect of $TiO_2$ (that is, "$TiO_x$") in the fibers of the present invention.

Examples whose components fall within the inventive range of compositions described herein demonstrate generally improved physical properties and reduced shrinkage as compared to the comparative examples detailed above. In particular, examples of glass ceramic fibers of the present invention demonstrate increased tensile strength, increased Young's modulus and decreased shrinkage as compared to the comparative examples detailed above.

Examples 72–74, and 83–86 of the continuous filament glass ceramic fibers of the present invention exceed target properties with regard to improved strength, with values for tensile strength generally greater than 250 Ksi and Young's modulus generally greater than 12 Msi. Target properties for improved linear thermal shrinkage characteristics are demonstrated by examples 31–33, 37–39, 48–50, 51–53, 56–58, 62–65, 66–67, 68–70, 77–81, and 83–86 with values of less than 3% shrinkage at 2300° F. for 24 hours. These results may be compared to those of the comparative examples 4 and 5, which report standard K Spun refractory ceramic fibers with tensile strengths of 164–174 Ksi, Young's modulus values of 9.2–9.4 Msi, and a thermal shrinkage value of 3.4% at 2300° F. for 24 hours.

The beneficial effect of a narrow range of $TiO_2$ concentrations on shrinkage characteristics may be seen by comparing comparative example 24 and example 49. The base glass compositions for these two samples are nearly identical except for a 1.5 mole % addition of $TiO_2$ to example 49. The shrinkage of comparative example 24 was 10.9% at 2300° F. compared to only 1.8% for example 49. Example 44 shows that a lower level of $TiO_2$ is not as effective in reducing shrinkage (11.2% shrinkage) as the higher levels of examples 49 and 57 (1.6% shrinkage). Example 57 also illustrates the beneficial effect of the addition of 2% $TiO_2$ when compared to comparative example 54, without $TiO_2$, which demonstrates 18.8% shrinkage.

As reported in Table II, in Examples 87–91, the high temperature strength of continuous filament glass ceramic fibers (MT in FIGS. 3 and 4) made on an experimental multi-filament bushing according to the invention were tested and Young's modulus determined at various temperatures, from 25° C. to 750° C. These were compared to fibers of commercial S glass comprising 68.6 mole % $SiO_2$, 15.6 mole % $Al_2O_3$ and 15.8 mole % MgO (S2, COM) in examples 92–96, E glass (mb) produced on the multifilament bushing in examples 97–100, and S glass (S2 mb) produced on the multifilament bushing in examples 101–104. All fibers were tested at 3 inch gauge length.

Figure 3:
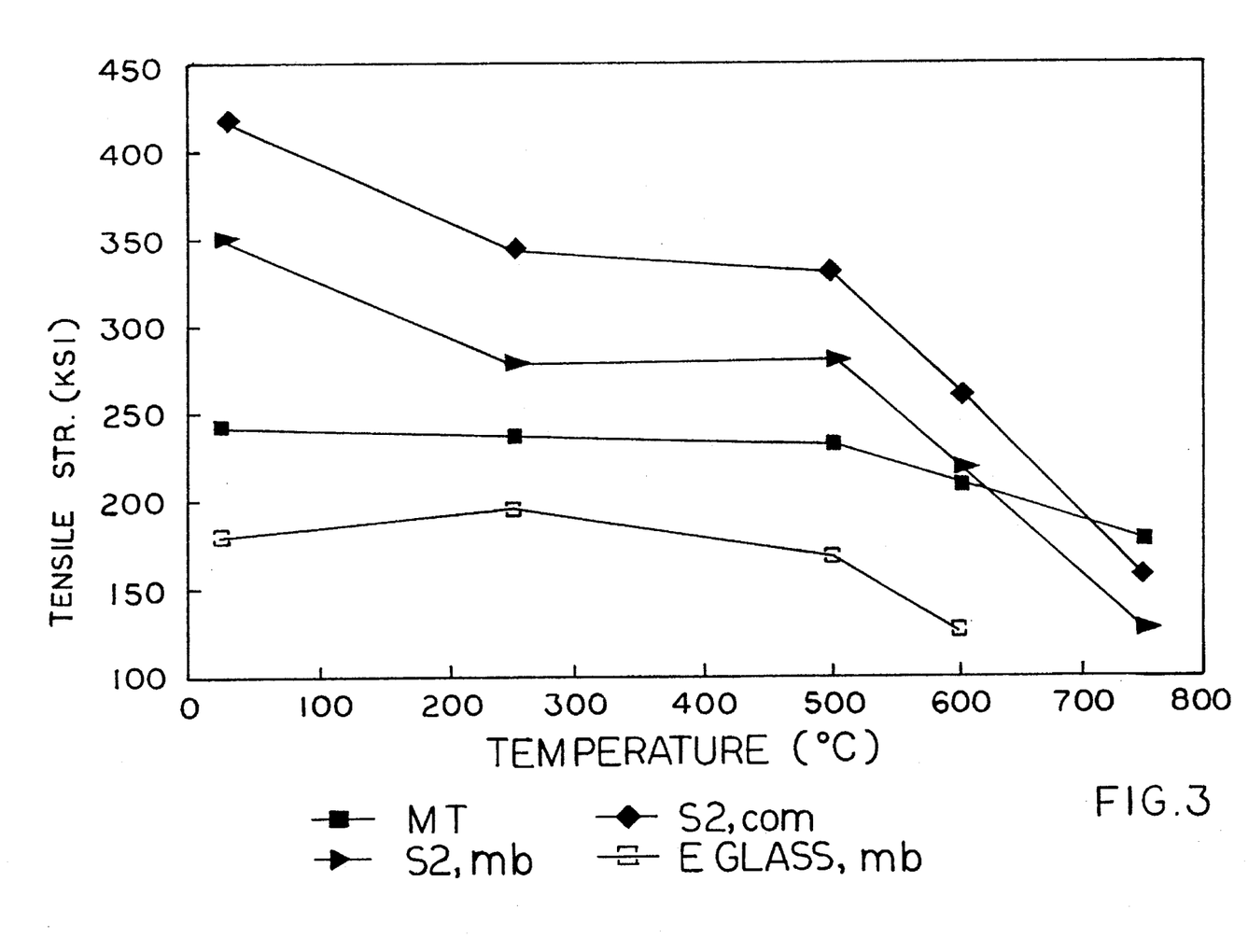
FIG. 3 is a graphical representation of fiber tensile strength versus temperature.
Figure 4:
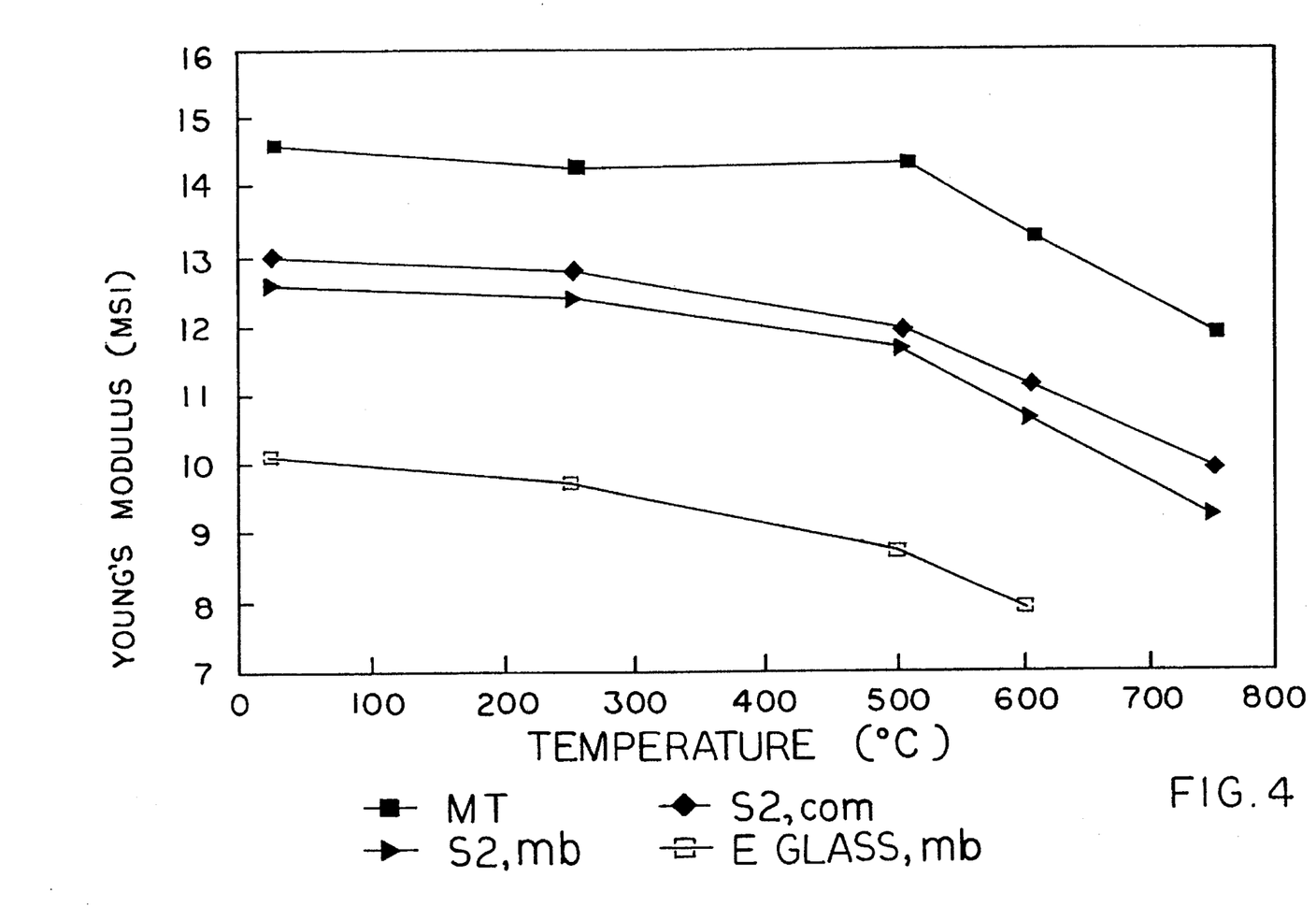
FIG. 4 is a graphical representation of the Youngs' Modulus of fiber versus temperature.

The data for tensile strength tests and Youngs' modulus determinations are graphically represented in FIG. 3 and FIG. 4 respectively. The benefit of the inventive glass ceramic fiber compositions is demonstrated by the maintenance of tensile strength at high temperatures. As shown in FIG. 3, the slope of the strength curve of the inventive fiber decreases the least at high temperatures, and in fact, the inventive fiber has the highest strength at 750° C. of any of the fibers tested. The slopes of the strength curves of the S glass fibers were compared to a curve of the experimental data reported by Harris et al in U.S. Pat. No. 3,402,055 described above, and were found to coincide, thereby validating the test protocol.

As shown in FIG. 4, Youngs' modulus was demonstrated to be higher for the inventive glass ceramic fiber than for fibers of the comparative S and E glasses.

Thus, the objects of the invention are accomplished by the present invention, which is not limited to the specific embodiments described above, but which includes variations, modifications, and equivalent embodiments defined by the following claims.

TABLE I

| EX. NO. | Diam. (micron) | | Tensile (KSI) | | Mod (MSI) | | Shrinkage | | | Composition Mole % | | |
|---|---|---|---|---|---|---|---|---|---|---|---|---|
| | Mean | Std. | Mean | Std. | Mean | Std. | 2300° F. | 2100° F. | 1800° F. | $SiO_2$ | $Al_2O_3$ | RO |
| 1 | 10.2 | 0.73 | 340.2 | 79.8 | 9.5 | 0.8 | 12.1 | 12.3 | 13.6 | 68.6 | 15.6 | 15.8 MgO (S-glass) |
| 2 | 16.0 | | 106.0 | 15.3 | 10.3 | 0.8 | | | | 57.4 | 9.1 | 33.5 (E-glass) |
| 3 | 11.2 | 0.83 | 231.8 | 43.2 | 8.8 | 0.3 | | | | 57.4 | 9.1 | 33.5 (E-glass) |
| 4 | 8.6 | 3.49 | 164.2 | 59.1 | 9.2 | 2.3 | 3.4 | 2.1 | 0.9 | 66.7 | 30.0 | 3.0 (Kspun) |
| 5 | 13.4 | 4.28 | 173.7 | 71.9 | 9.4 | 2.6 | | | | 66.7 | 30.0 | 3.0 (Kspun) |
| 6 | 11.5 | 0.87 | 147.3 | 49.9 | 5.9 | 1.6 | | | | 86.3 | 10.5 | 3.2 CaO |
| 7 | 14.8 | 1.32 | 141.0 | 37.8 | 8.8 | 1.6 | | 15.1 | 9.0 | 86.3 | 10.5 | 3.2 CaO |
| 8 | 10.7 | 3.95 | 134.7 | 39.4 | 8.2 | 1.5 | | | | 86.3 | 10.5 | 3.2 CaO |

TABLE I-continued

| EX. NO. | Diam. (micron) Mean | Std. | Tensile (KSI) Mean | Std. | Mod (MSI) Mean | Std. | Shrinkage 2300° F. | 2100° F. | 1800° F. | Composition Mole % SiO₂ | Al₂O₃ | RO |
|---|---|---|---|---|---|---|---|---|---|---|---|---|
| 9 | 9.6 | 0.67 | 175.3 | 72.5 | 9.3 | 1.6 | | | | 86.3 | 10.5 | 3.2 MgO |
| 10 | 9.3 | 0.89 | 201.7 | 70.3 | 10.4 | 2.6 | | | | 86.3 | 10.5 | 3.2 MgO |
| 11 | 9.3 | 0.81 | 175.2 | 47.9 | 9.6 | 1.5 | 8.8 | | 0.6 | 86.3 | 10.5 | 3.2 MgO |
| 12 | 10.2 | 0.29 | 193.4 | 64.8 | 9.8 | 0.8 | 15.3 | 17.0 | 2.0 | 86.3 | 10.5 | 3.2 BaO |
| 13 | 9.6 | 1.38 | 138.8 | 43.1 | 9.1 | 0.7 | | 5.0 | | 89.0 | 10.0 | 1.0 CaO |
| 14 | 7.5 | 0.64 | 161.6 | 46.4 | 9.9 | 3.3 | | | | 90.5 | 5.2 | 4.3 ZrO₂ |
| 15 | 10.0 | 0.98 | 155.8 | 62.9 | 10.2 | 1.5 | | | | 90.5 | 5.2 | 4.3 ZrO₂ |
| 16 | 12.1 | 0.89 | 92.9 | 30.3 | 8.1 | 1.6 | | | | 90.5 | 5.2 | 4.3 TiO₂ |
| 17 | 13.7 | 0.51 | 120.7 | 42.9 | 9.0 | 0.9 | 5.4 | 3.6 | | 90.5 | 5.2 | 4.3 TiO₂ |
| 18 | 15.0 | 0.88 | 102.7 | 57.8 | 8.1 | 1.4 | 8.2 | | | 90.5 | 5.2 | 4.3 ZrO₂ |
| 19 | 19.7 | 1.94 | 83.3 | 27.0 | 8.0 | 1.3 | | | | 90.5 | 5.2 | 4.3 ZrO₂ |
| 20 | 11.7 | 0.75 | 114.8 | 40.3 | 9.5 | 1.7 | | | | 90.5 | 5.2 | 4.3 TiO₂ |
| 21 | 10.4 | 1.59 | 193.1 | 62.7 | 10.6 | 2.4 | | | | 84.9 | 7.5 | 7.6 ZrO₂ |
| 22 | 8.6 | 1.48 | 194.3 | 94.6 | 11.7 | 1.5 | | | | 84.9 | 7.5 | 7.6 ZrO₂ |
| 23 | 10.5 | 0.23 | 229.3 | 57.3 | 11.2 | 1.2 | | | | 78.1 | 13.9 | 8.0 MgO |
| 24 | 8.6 | 0.67 | 225.6 | 62.9 | 10.1 | 1.6 | 9.8 | 8.8 | 1.4 | 78.1 | 13.9 | 8.0 MgO |
| 25 | 16.2 | 1.71 | 183.9 | 40.2 | 10.2 | 1.1 | 10.9 | 10.2 | | 78.1 | 13.9 | 8.0 MgO |
| 26 | 9.6 | 1.30 | 169.2 | 52.9 | 7.6 | 1.4 | 13.4 | 9.5 | 1.4 | 78.0 | 11.0 | 9 MgO, 2 ZrO₂ |
| 27 | 6.0 | 0.25 | 273.8 | 69.3 | 9.3 | 1.4 | | | | 78.0 | 11.0 | 9 MgO, 2 ZrO₂ |
| 28 | 5.3 | 0.39 | 330.3 | 95.9 | 11.3 | 1.7 | 16.2 | 11.9 | 1.4 | 78.0 | 11.0 | 9 MgO, 2 ZrO₂ |
| 29 | 7.1 | 0.64 | 271.3 | 111.3 | 10.9 | 1.5 | | | | 78.0 | 11.0 | 9 MgO, 2 ZrO₂ |
| 30 | 11.6 | 0.38 | 227.4 | 53.8 | 10.8 | 0.9 | | | | 78.0 | 11.0 | 9 MgO, 2 ZrO₂ |
| 31 | 6.5 | 0.46 | 243.9 | 56.4 | 11.0 | 1.4 | 2.8 | 1.3 | | 80.1 | 10.0 | 8.1 MgO, 1.8 TiO₂ |
| 32 | 6.4 | 0.31 | 228.7 | 67.0 | 9.7 | 1.0 | | | | 80.1 | 10.0 | 8.1 MgO, 1.8 TiO₂ |
| 33 | 11.1 | 0.21 | 157.2 | 22.9 | 10.0 | 0.7 | | | | 80.1 | 10.0 | 8.1 MgO, 1.8 TiO₂ |
| 34 | | | | | | | 3.1 | | | | | Kspun |
| 35 | 8.6 | 0.41 | 130.0 | 33.7 | 7.7 | 0.9 | 4.1 | | | 81.6 | 10.0 | 6.8 MgO, 1.6 TiO₂ |
| 36 | | | | | | 3.1 | | | | | | Kspun |
| 37 | 6.4 | 0.41 | 143.9 | 47.7 | 8.4 | 1.1 | 2.2 | | | 78.0 | 10.0 | 10.5 MgO, 1.5 TiO₂ |
| 38 | 5.8 | 0.01 | 178.9 | 57.1 | 9.4 | 0.4 | | | | | | 10.5 MgO, 1.5 TiO₂ |
| 39 | 9.8 | 0.51 | 160.3 | 34.6 | 7.7 | 0.8 | | | | 78.0 | 11.0 | 10.5 MgO, 1.5 TiO₂ |
| 40 | | | | | | 3.4 | | | | | | Kspun |
| 41 | 9.3 | 0.30 | 178.3 | 36.0 | 9.1 | 0.7 | | | | 78.0 | 10.0 | 10.5 MgO, 1.5 TiO₂ |
| 42 | 8.4 | 0.78 | 161.0 | 51.0 | 8.0 | 1.3 | | | | 78.0 | 11.0 | 11 MgO |
| 43 | 7.1 | 0.22 | 270.3 | 101.4 | 9.3 | 0.7 | | | | 78.0 | 12.0 | 9.0 MgO, 1.0 TiO₂ |
| 44 | 13.1 | 0.23 | 137.4 | 83.7 | 8.8 | 0.4 | 11.2 | | | 78.0 | 12.0 | 9.0 MgO, 1.0 TiO₂ |
| 45 | 9.0 | 0.20 | 209.9 | 94.3 | 9.2 | 0.6 | | | | 78.0 | 12.0 | 9.0 MgO, 1.0 TiO₂ |
| 46 | 7.7 | 0.15 | 205.9 | 65.1 | 9.1 | 0.5 | | | | 78.0 | 12.0 | 9.0 MgO, 1.0 TiO₂ |
| 47 | | | | | | | 3.0 | | | | | Kspun |
| 48 | 5.6 | 0.18 | 245.3 | 52.7 | 10.2 | 0.8 | | | | 78.0 | 12.3 | 8.2 MgO, 1.5 TiO₂ |
| 49 | 7.0 | 0.13 | 231.5 | 34.9 | 10.3 | 0.5 | 1.8 | | | 78.0 | 12.3 | 8.2 MgO, 1.5 TiO₂ |
| 50 | 10.9 | 0.18 | 183.3 | 23.0 | 10.0 | 0.3 | | | | 78.0 | 12.3 | 8.2 MgO, 1.5 TiO₂ |
| 51 | 15.1 | 0.15 | 204.3 | 34.4 | 11.7 | 0.4 | | | | 81.0 | 10.0 | 7.5 MgO, 1.5 TiO₂ |
| 52 | 9.8 | 0.11 | 204.6 | 36.1 | 12.0 | 0.4 | | | | 81.0 | 10.0 | 7.5 MgO, 1.5 TiO₂ |
| 53 | 21.8 | 0.62 | 181.5 | 35.4 | 10.5 | 0.4 | 1.1 | | | 81.0 | 10.0 | 7.5 MgO, 1.5 TiO₂ |
| 54 | 6.2 | 0.30 | 194.0 | 78.0 | 8.7 | 1.0 | 18.8 | | | 78.0 | 11.0 | 11 MgO |
| 55 | 8.7 | 0.23 | 181.3 | 44.0 | 9.8 | 0.6 | | | | 78.0 | 11.0 | 11 MgO |
| 56 | 9.1 | 0.36 | 176.8 | 36.0 | 9.5 | 0.8 | | | | 78.0 | 10.0 | 10 MgO, 2 TiO₂ |
| 57 | 11.6 | 0.39 | 165.0 | 28.0 | 10.0 | 0.7 | 1.6 | | | 78.0 | 10.0 | 10 MgO, 2 TiO₂ |
| 58 | 8.4 | 0.47 | 151.0 | 52.0 | 8.8 | 1.1 | | | | 78.0 | 10.0 | 10 MgO, 2 TiO₂ |
| 59 | 10.0 | 0.12 | 222.5 | 47.2 | 11.6 | 0.4 | | | | 81.0 | 10.0 | 7.5 MgO, 1.5 TiO₂ |
| 60 | 7.7 | 0.13 | 226.3 | 61.1 | 11.6 | 0.4 | | | | 81.0 | 10.0 | 7.5 MgO, 1.5 TiO₂ |
| 61 | | | | | | | 2.4 | | | | | Kspun |
| 62 | 7.4 | 0.14 | 274.7 | 81.8 | 10.2 | 0.4 | | | | 79.5 | 9.5 | 7.7 MgO, 1.5 TiO₂, 1.8 ZrO₂ |
| 63 | 9.1 | 0.12 | 214.9 | 87.4 | 10.4 | 0.3 | 2.2 | | | 79.5 | 9.5 | 7.7 MgO, 1.5 TiO₂, 1.8 ZrO₂ |
| 64 | 6.2 | 0.18 | 361.0 | 76.1 | 10.8 | 0.7 | | | | 79.5 | 9.5 | 7.7 MgO, 1.5 TiO₂, 1.8 ZrO₂ |
| 65 | 13.2 | 0.16 | 179.4 | 65.4 | 11.8 | 0.4 | | | | 79.5 | 9.5 | 7.7 MgO, 1.5 TiO₂, 1.8 ZrO₂ |
| 66 | 7.3 | 0.12 | 256.5 | 96.2 | 11.3 | 0.5 | 1.6 | | | 79.5 | 9.5 | 7.7 MgO, 1.5 TiO₂, 1.8 ZrO₂ |
| 67 | 9.6 | 0.13 | 212.9 | 68.1 | 11.6 | 0.4 | | | | 79.5 | 9.5 | 7.7 MgO, 1.5 TiO₂, 1.8 ZrO₂ |
| 68 | 9.7 | 0.12 | 297.4 | 61.1 | 11.6 | 0.4 | | | | 76.0 | 11.66 | 10.84 MgO, 1.5 TiO₂ |
| 69 | 11.8 | 0.14 | 266.8 | 44.9 | 11.4 | 0.3 | 0.8 | | | 76.0 | 11.66 | 10.84 MgO, 1.5 TiO₂ |
| 70 | 7.1 | 0.13 | 286.2 | 74.0 | 11.1 | 0.4 | | | | 76.0 | 11.66 | 10.84 MgO, 1.5 TiO₂ |
| 71 | | | | | | | 2.5 | | | | | Kspun |
| 72 | 10.4 | 0.13 | 276.0 | 33.4 | 12.5 | 0.4 | | | | 68.6 | 15.6 | 14.3 MgO, 1.5 TiO₂ |
| 73 | 7.6 | 0.15 | 293.6 | 28.1 | 12.3 | 0.5 | 5.7 | | | 68.6 | 15.6 | 14.3 MgO, 1.5 TiO₂ |
| 74 | 14.6 | 0.34 | 218.1 | 24.9 | 11.5 | 0.6 | | | | 68.6 | 15.6 | 14.3 MgO, 1.5 TiO₂ |
| 75 | | | | | | | 10.8 | | | 68.6 | 15.6 | 15.3 MgO + 0.5 TiO₂ |
| 76 | | | | | | | 2.9 | | | | | Kspun |
| 77 | 6.1 | 0.26 | 320.0 | 36.0 | 11.8 | 1.2 | | | | 76.0 | 11.66 | 10.84 MgO, 1.5 TiO₂ |
| 78 | 9.4 | 0.44 | 270.6 | 46.2 | 10.9 | 0.9 | | | | 76.0 | 11.66 | 10.84 MgO, 1.5 TiO₂ |
| 79 | 14.5 | 0.65 | 213.0 | 36.9 | 10.5 | 0.9 | | | | 76.0 | 11.66 | 10.84 MgO, 1.5 TiO₂ |
| 80 | 4.1 | 0.21 | 281.0 | 42.0 | 10.2 | 1.0 | | | | 76.0 | 11.66 | 10.84 MgO, 1.5 TiO₂ |
| 81 | | | | | | | 2.5 | | | 76.0 | 11.60 | 10.84 MgO, 1.5 TiO₂ |
| 82 | | | | | | | 3.3 | | | | | Kspun |
| 83 | | | | | | | 1.7 | | | 79.5 | 9.5 | 7.7 MgO, 1.5 TiO₂, 1.8 ZrO₂ |

TABLE I-continued

| EX. NO. | Diam. (micron) Mean | Diam. (micron) Std. | Tensile (KSI) Mean | Tensile (KSI) Std. | Mod (MSI) Mean | Mod (MSI) Std. | Shrinkage 2300° F. | Shrinkage 2100° F. | Shrinkage 1800° F. | Composition Mole % SiO₂ | Composition Mole % Al₂O₃ | Composition Mole % RO |
|---|---|---|---|---|---|---|---|---|---|---|---|---|
| 84 | 6.6 | 0.23 | 317.3 | 100.7 | 12.2 | 0.8 | | | | 79.5 | 9.5 | 7.7 MgO, 1.5 TiO₂, 1.8 ZrO₂ |
| 85 | 10.8 | 0.59 | 248.7 | 87.9 | 13.3 | 1.5 | | | | 79.5 | 9.5 | 7.7 MgO, 1.5 TiO₂, 1.8 ZrO₂ |
| 86 | 15.3 | 0.65 | 177.8 | 31.8 | 12.4 | 0.8 | | | | 79.5 | 9.5 | 7.7 MgO, 1.5 TiO₂, 1.8 ZrO₂ |

TABLE II

| EX. NO. | TEST TEMP °C. | DIAM. (microns) MEAN | DIAM. (microns) STD. | TENSILE (KSI) MEAN | TENSILE (KSI) STD. | MOD (MSI) MEAN | MOD (MSI) STD. | COMPOSITION MOLE % SiO₂ | COMPOSITION MOLE % AL₂O₃ | COMPOSITION MOLE % RO |
|---|---|---|---|---|---|---|---|---|---|---|
| 87 | 25.0 | 15.9 | 0.69 | 184.8 | 27.6 | 13.7 | 1.2 | 67.5 | 15.3 | 15.5 MgO, 1.5 TiO₂ |
| 88 | 25.0 | 16.0 | 0.54 | 190.2 | 35.5 | 13.6 | 0.9 | 67.5 | 15.3 | 15.5 MgO, 1.5 TiO₂ |
| 89 | 260.0 | 15.9 | 0.43 | 181.9 | 44.4 | 13.4 | 0.7 | 67.5 | 15.3 | 15.5 MgO, 1.5 TiO₂ |
| 90 | 500.0 | 15.9 | 0.53 | 177.3 | 30.4 | 13.5 | 1.0 | 67.5 | 15.3 | 15.5 MgO, 1.5 TiO₂ |
| 91 | 750.0 | 16.0 | 0.50 | 121.7 | 23.5 | 11.2 | 0.8 | 67.5 | 15.3 | 15.5 MgO, 1.5 TiO₂ |
| 92 | 25.0 | 9.6 | 1.10 | 393.4 | 70.6 | 12.5 | 0.6 | (S2 COM) | | |
| 93 | 25.0 | 9.2 | 1.06 | 451.7 | 91.5 | 13.6 | 0.6 | (S2 COM) | | |
| 94 | 260.0 | 9.3 | 0.92 | 332.6 | 60.7 | 12.4 | 0.8 | (S2 COM) | | |
| 95 | 500.0 | 9.7 | 0.59 | 333.5 | 56.6 | 12.1 | 0.5 | (S2 COM) | | |
| 96 | 750.0 | 9.7 | 0.97 | 159.0 | 17.4 | 10.1 | 0.6 | (S2 COM) | | |
| 97 | 25.0 | 6.5 | 0.56 | 211.9 | 49.2 | 10.6 | 0.7 | E Glass (mb) | | |
| 98 | 250.0 | 6.8 | 0.44 | 223.2 | 68.0 | 10.2 | 0.5 | E Glass (mb) | | |
| 99 | 500.0 | 6.7 | 0.40 | 197.6 | 28.2 | 9.2 | 0.8 | E Glass (mb) | | |
| 100 | 600.0 | 6.8 | 0.49 | 152.4 | 25.0 | 8.4 | 0.7 | E Glass (mb) | | |
| 101 | 25.0 | 8.2 | 1.39 | 366.5 | 46.8 | 12.9 | 0.6 | S2 mb | | |
| 102 | 250.0 | 8.2 | 0.72 | 294.7 | 56.5 | 12.7 | 0.5 | S2 mb | | |
| 103 | 500.0 | 8.0 | 1.02 | 299.7 | 60.6 | 12.0 | 0.7 | S2 mb | | |
| 104 | 750.0 | 8.2 | 1.20 | 141.8 | 40.1 | 9.6 | 0.9 | S2 mb | | |

We claim:

1. High temperature stable glass fibers consisting essentially of
   i) about 67.5 to about 85 mole percent $SiO_2$,
   ii) about 9.5 to about 20 mole percent $Al_2O_3$,
   iii) about 5 to about 15.5 mole percent MgO,
   iv) about 0.5 to about 5 mole percent $TiO_x$, wherein $0<x<2$, and
   v) 0 to about 5 mole percent $ZrO_2$.

2. The high temperature stable glass fibers of claim 1, wherein said $TiO_x$ is present in an amount of about 1 to about 2 mole percent.

3. High temperature stable continuous filament glass fibers consisting essentially of
   i) about 67.5 to about 85 mole percent SiO2,
   ii) about 9.5 to about 20 mole percent $Al_2O_3$,
   iii) about 5 to about 15.5 mole percent MgO,
   iv) about 0.5 to about 5 mole percent $TiO_x$, wherein $0<x<2$, and
   v) 0 to about 5 mole percent $ZrO_2$.

4. The high temperature stable continuous filament glass fibers of claim 3, wherein said $TiO_x$ is present in an amount of about 1 to about 2 mole percent.

5. The high temperature stable continuous filament glass fibers of claim 3 wherein said fibers exhibit thermal shrinkage of less than about 3% at 2300° F. for 24 hours.

6. The high temperature stable continuous filament glass fibers of claim 3 wherein said $TiO_x$ present in an amount of 1.25–1.5 mole percent.

7. The high temperature stable continuous filament glass fibers of claim 3 wherein said fibers exhibit an upper use temperature limit of about 2300° F.

8. The high temperature stable continuous filament glass fibers of claim 3 wherein said fibers exhibit a tensile strength greater than about 250 Ksi.

9. The high temperature stable continuous filament glass fibers of claim 3 wherein said fibers exhibit a Young's modulus greater than about 12 Msi.

10. The high temperature stable continuous filament glass fibers of claim 3, wherein said fibers consist essentially of about 68 to about 82 mole percent $SiO_2$, about 10 to about 18 mole percent $Al_2O_3$, about 6 to about 14 mole percent MgO, about 1 to about 2 mole percent $TiO_x$, and 0 to about 3 mole percent $ZrO_2$.

11. The high temperature stable continuous filament glass fibers of claim 10, wherein said fibers consist essentially of about 72 to about 80 mole percent $SiO_2$, about 10 to about 16 mole percent $Al_2O_3$, about 7 to about 14 mole percent MgO, about 1.25 to about 1.5 mole percent $TiO_x$, and about 0 to about 2 mole percent $ZrO_2$.

12. The high temperature stable continuous filament glass fibers of claim 3 wherein said fibers are substantially free from shot.

13. The high temperature stable continuous filament glass fibers of claim 3 wherein said fibers have an average diameter of about 5 to about 50 microns.

14. The high temperature stable continuous filament glass fibers of claim 3, wherein said fibers are incorporated into a thermally insulating article selected from the group consisting of woven textile, rope, braid, board, paper, blanket, and mat.

15. The high temperature stable continuous filament glass fibers of claim 3, wherein said fibers are incorporated as a reinforcement into an organic matrix.

16. The high temperature stable continuous filament glass fibers of claim 15, wherein said fiber reinforced matrix forms a friction disc.

17. The high temperature stable continuous filament glass fibers of claim 3 wherein $ZrO_2$ is present in an mount effective to achieve a mean tensile strength of at least about 175 KSi.

18. The high temperature stable continuous filament glass fibers of claim 13 wherein said fibers have an average diameter of about 5 to about 15 microns.

19. The high temperature stable continuous filament glass fibers of claim 3, wherein said fibers are incorporated as a reinforcement into a matrix of carbon.

20. The high temperature stable continuous filament glass fibers of claim 17, wherein $ZrO_2$ is present in the amount of about 1.8 mole percent.

21. The high temperature stable glass fibers of claim 1, wherein said fibers exhibit thermal shrinkage of less than about 3% at 2300° F. for 24 hours.

22. The high temperature stable glass fibers of claim 1, wherein $ZrO_2$ is present in an amount effective to achieve a mean tensile strength of at least about 175 KSi.

23. The high temperature stable glass fibers of claim 22, wherein $ZrO_2$ is present in the amount of about 1.8 mole percent.

* * * * *